United States Patent [19]

Yoshihara

[11] Patent Number: 4,918,707
[45] Date of Patent: Apr. 17, 1990

[54] SPREAD SPECTRUM DEMODULATING DEVICE FOR SPREAD SPECTRUM COMMUNICATION SYSTEM

[75] Inventor: Masashi Yoshihara, Tokyo, Japan

[73] Assignee: NEC Corporation, Tokyo, Japan

[21] Appl. No.: 281,413

[22] Filed: Dec. 8, 1988

[30] Foreign Application Priority Data

Dec. 9, 1987 [JP] Japan .................................. 62-311423

[51] Int. Cl.$^4$ .............................................. H04K 1/00
[52] U.S. Cl. ........................................................ 375/1
[58] Field of Search ................................ 375/1; 380/34

[56] References Cited

U.S. PATENT DOCUMENTS

| 4,017,798 | 4/1977 | Gordy et al. | 375/1 |
| 4,163,944 | 8/1979 | Chamber et al. | 375/1 |
| 4,285,060 | 8/1981 | Cobb et al. | 375/1 |
| 4,538,280 | 8/1985 | Mosley, Jr. et al. | 375/1 |
| 4,635,274 | 1/1987 | Kubota et al. | 375/1 |
| 4,760,586 | 7/1988 | Takeda et al. | 375/1 |
| 4,761,796 | 8/1988 | Dunn et al. | 375/1 |
| 4,860,307 | 8/1989 | Nakayama et al. | 375/1 |

Primary Examiner—Salvatore Cangialosi
Attorney, Agent, or Firm—Sughrue, Mion, Zinn, Macpeak & Seas

[57] ABSTRACT

A spread spectrum demodulating device applicable to a spread spectrum communications system for demodulating a spread spectrum signal by inverse spread. A spread clock is directly recovered from a received spread spectrum signal to thereby generate a predetermined PN (Pseudo Noise) signal.

3 Claims, 2 Drawing Sheets

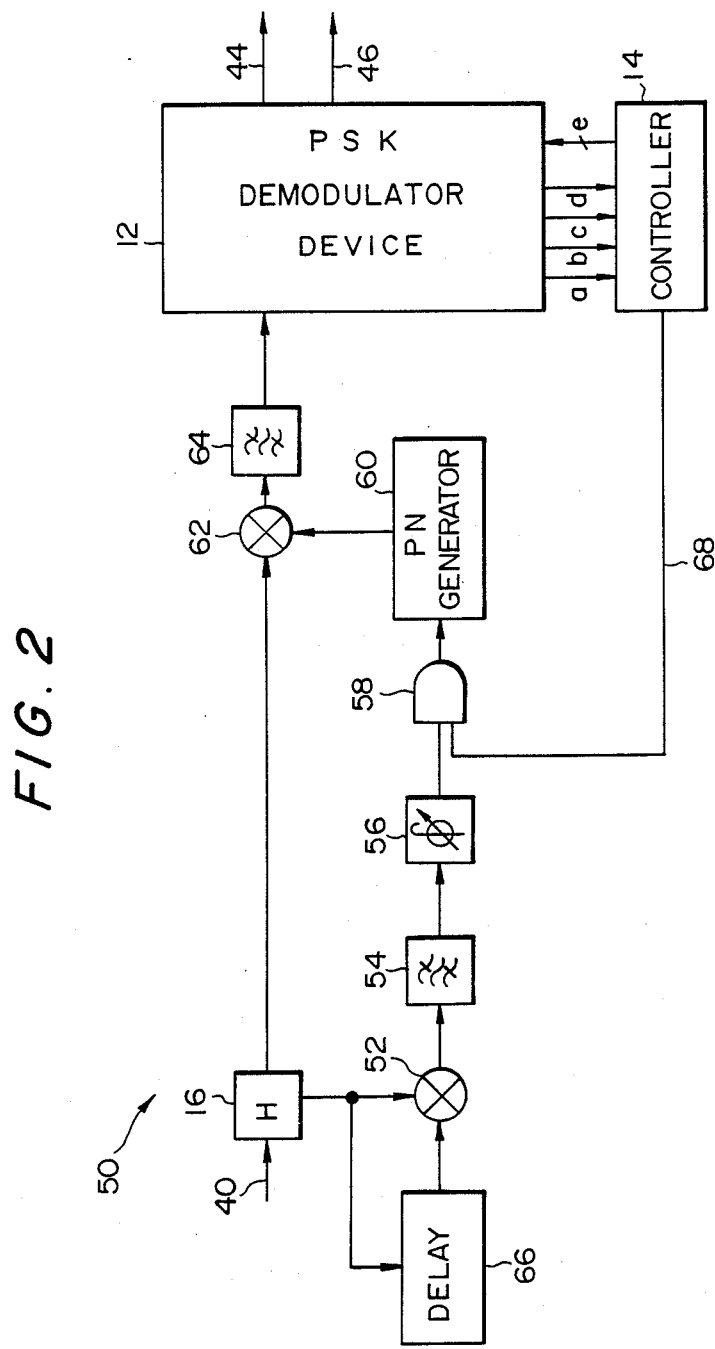

SPREAD SPECTRUM DEMODULATING DEVICE FOR SPREAD SPECTRUM COMMUNICATION SYSTEM

BACKGROUND OF THE INVENTION

The present invention relates to a spread spectrum communication system and, more particularly, to a spread spectrum demodulating device for demodulating a spread spectrum signal by inverse spread.

In a spread spectrum communication signal, a spread spectrum signal is produced by spreading to N-fold a PSK (Phase Shift Keying) modulated data signal or PSK modulated signal by a PN (Pseudo Noise) signal. A device for receiving and demodulating the spread spectrum signal is generally constituted by a spread spectrum demodulating device and a PSK demodulating device. The spread spectrum demodulating device demodulates the PSK modulated signal by inversely spreading the received spread spectrum signal, while the PSK demodulating device regenerates the data signal by applying synchronization detection to the demodulated PSK modulated signal.

A prior art spread spectrum demodulating device which precedes a PSK demodulating device includes a mixer for inversely spreading an input spread spectrum signal to produce a demodulated PSK modulated signal. The demodulated PSK demodulated signal is passed through a band-pass filter to obtain a predetermined processing gain and then applied to a detector for envelop detection. The resulting output of the detector is fed to a comparator to determine whether or not a demodulated PSK demodulated signal has been detected. This kind of device, however, has a drawback that the decision associated with a demodulated PSK demodulated signal comes to involve errors and eventually results in malfunctions as the carrier-to-noise (C/N) ratio after the propagation of the signal through the band-pass filter approaches zero decibel. Further, each detector has a low-pass filter at its output stage and makes the band width of the filter extremely narrow under low C/N conditions so as to suppress the signal diffusion. This not only slows down the response but also results in a prohibitively long capture time. In addition, the prior art device is extremely complicated in construction.

For details of the spread spectrum demodulation techniques discussed above, a reference may be made to J. J. Spilker, Jr. "Delay-Lock Tracking of Binary Signals", IEEE TRANSACTIONS ON SPACE ELECTRONICS AND TELEMETRY 1963 March, page 7, FIG. 8.

SUMMARY OF THE INVENTION

It is therefore an object of the present invention to provide a spread spectrum demodulating device for a spread spectrum communications system which can be implemented in a simple construction and is operable even under low C/N ratio conditions.

A spread spectrum demodulating device for a spread spectrum communication system of the present invention comprises a splitter for splitting into two a spread spectrum signal produced by spreading a PSK (Phase Shift Keying) modulated data signal by PN (Pseudo Noise) signal, a delay circuit for delaying one of two outputs of the splitter by half a bit, a first mixer supplied at one input terminal with the one output of the splitter and at the other input terminal with an output of the delay circuit for recovering a spread clock out of the spread spectrum signal, a first band-pass filter for filtering an output of the first mixer to separate the recovered spread clock, a phase shifter for adjusting the separated recovered clock with respect to phase, an AND gate for gating an output of the phase shifter in response to a sweep control signal which is entered from outside, a PN generator for generating the PN signal in response to the recovered spread clock which is fed from the AND gate, a second mixer for inversely spreading the other output of the splitter by an output of the PN generator means, and a second band-pass filter for removing unnecessary waves from an output of the second mixer means.

BRIEF DESCRIPTION OF THE DRAWINGS

The above and other objects, features and advantages of the present invention will become more apparent from the following detailed description when taken with the accompanying drawings in which:

FIG. 2 is a schematic block diagram showing a spread spectrum demodulating device embodying the present invention.

DESCRIPTION OF THE PREFERRED EMBODIMENT

Figure 1:
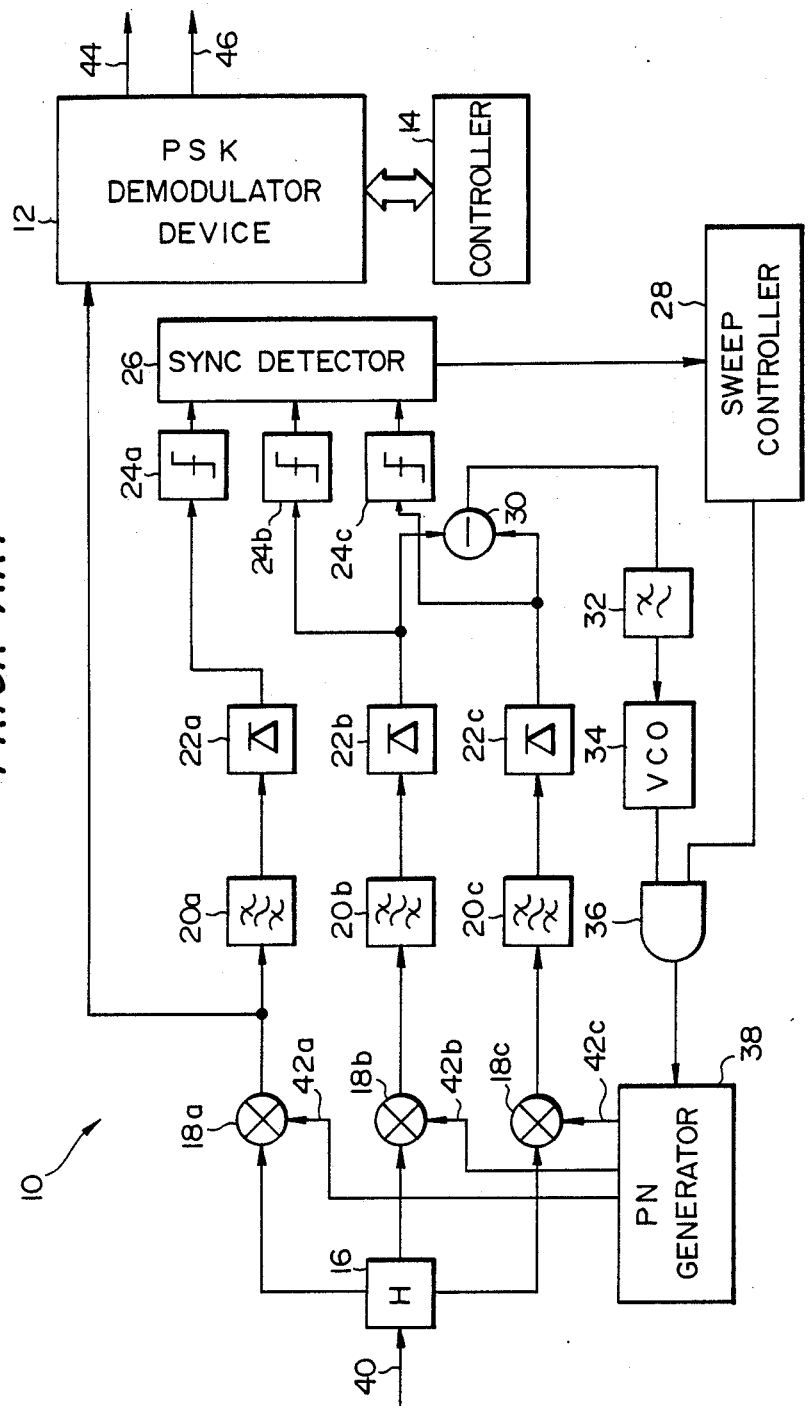
FIG. 1 is a schematic block diagram showing a prior art spread spectrum demodulating device.

To better understand the present invention, a brief reference will be made to a typical prior art spread spectrum demodulating device, shown in FIG. 1. As shown, the prior art spread spectrum demodulating device 10 is located at a stage which precedes a PSK demodulating device 12 and a controller 14 thereof. The demodulating device 10 is made up of a splitter 16, mixers 18a, 18b and 18c, band-pass filters (BPFs) 20a, 20b and 20c, detectors 22a, 22b and 22c, comparators 24a, 24b and 24c, a synchronization detector 26, a sweep controller 28, a subtractor 30, a loop filter 32, a voltage-controlled oscillator (VCO) 34, an AND gate 36, and a PN generator 38.

A spread spectrum signal is split into three by the splitter 16 to be applied to one input of the three mixers 18a to 18c. The spread spectrum signal 40 is produced by spreading a PSK modulated data signal spectrum to N-fold (N being an integer) by use of a PN signal. The PN generator 38 generates PN signals 42a, 42b and 42c in response to an output of the AND gate 36 (spread clock) and delivers them to the other input of the mixers 18a, 18b and 18c. More specifically, the three PN signals 42a to 42c are generated in such a relation that the PN signal 42a has the same phase as the input spread clock, the PN signal 42b is advanced in phase by half the clock relative to the input spread clock, and the PN signal 42c is delayed by half the clock relative to the same. Applied to one input of the AND gate 36 is an output of the VCO 34 (i.e. spread clock) and to the other input is an output of the sweep controller 28 (i.e. sweep control signal). The VCO 34 generates a spread clock having a predetermined frequency by using an output of the loop filter 32 as a control voltage.

When the output of the synchronization detector 26 is indicative of "synchronized," the sweep controller 28 holds the sweep control signal at a (logical) ONE level so that the output of the VCO 34 may appear on the output of the AND gate 36 as it is. Conversely, when the output of the synchronization detector 26 is indicative of "non-synchronized," the sweep controller 28 turns the level of the sweep signal to a (logical) ZERO level for the duration of one clock pulse every predetermined period of time, thereby causing one clock pulse to be lost at every predetermined interval. The mixers 18a to 18c inversely spread the input spread spectrum signal by their associated PN signals 42a to 42c so as to demodulate the PSK modulated signal. Outputs of the mixers 18a to 18c are individually applied to the BPFs 20a to 20c to be thereby provided with a predetermined processing gain. The outputs of the BPFs 20a to 20C are individually fed to the detectors 22a and 22c for envelope detection and therefrom to the comparators 24a to 24c. Simultaneously, the outputs of the detectors 22b and 22c are delivered to the subtractor 30. The resulting output of the subtractor 30 is routed through the loop filter 32 to the VCO 34 to serve as a control voltage.

The comparators 24a to 24c each compares the level of the input signal with a threshold level and delivers the result to the synchronization detector 26. When none of the comparators 24a to 24c is indicative of non-detection of a PSK modulated signal, the synchronization detector 26 turns its output to the sweep controller 28 into "non-synchronized". On the other hand, when any of the comparators 24a to 24c is indicative of detection of a PSK modulated signal, the synchronization detector 26 turns its output into "synchronized". Upon the change of the output of the synchronization detector 26 to "synchronized," an output of the VCO 34 is directly applied to the PN generator 38 in the form of a spread clock to thereby establish a delay-lock loop. The PSK modulated signal demodulated by the delay-lock loop appears on the output of the mixer 18a and is applied to the PSK demodulating device 12, whreby demodulated data 44 and a demodulated clock 46 are obtained. The controller 14 is adapted to control the PSK demodulating device 12.

A problem with the prior art demodulating device 10 is as follows. As the carrier-to-noise (C/N) ratio after the PSK modulated signal demoduated by the inverse spread of the spread spectrum signal has been provided with a predetermined processing gain by band-pass filtering sequentially approaches zero decibel, the signal decision performed by the individual comparators 24a to 24c come to involve errors and eventually results in malfunctions. Further, since the detectors 22a to 22c each has a low-pass filter at its output stage and makes the band width of the filter extremely narrow under low C/N ratio conditions so as to suppress signal spread, not only the response is slow but also a prohibitively long period of time expires before the capture. In addition, the delay-lock loop which constitutes the major part of the demodulating device 10 renders the whole arrangement extremely complicated.

Referring to FIG. 2, a spread spectrum demodulating device embodying the present invention is shown and generally designated by the reference numeral 50. In the figure, the same or similar structural elements as those shown in FIG. 1 are designated by like reference numerals. As shown, the demodulating device 50 comprises a splitter 16, a first mixer 52, a first BPF 54, a phase shifter 56, an AND gate 58, a PN generator 60, a second mixer 62, a second BPF 64, and a $\frac{1}{2}$ bit delay circuit 66.

The splitter 16 feeds an incoming spread spectrum signal 40 to one input of the first mixer 52 and the delay circuit 66 as well as to one input of the second mixer 62. The delay circuit 66 delays the input signal 40 by each half bit and feeds its output to the other input of the first mixer 52. As a result, a signal produced by converting the spread spectrum signal of an intermediate frequency band into the baseband appears on the output of the first mixer 52. Since a spread clock component appears in the output of the first mixer 52, a recovered version of the spread clock is separated by the first BPF 54. The recovered spread clock is applied to one input of the AND gate 58 after being adjusted in phase by the phase shifter 56. Applied to the other input of the AND gate 58 is a 1-bit sweep control signal 68 from the controller 14. Hence, the recovered spread clock undergone phase adjustment as mentioned is fed from the AND gate 58 to the PN generator 60 in response to the sweep control signal 68. The sweep control signal 68 plays the same role as the prior art sweep control signal.

The PN generator 60 therefore generates a PN signal in response to the recovered spread clock and delivers it to the other input of the second mixer 62. Since the recovered spread clock is directly obtained from the received spread spectrum signal 40, it will be seen that the bit pattern of the PN signal generated by the PN generator 60 is synchronous to the bit pattern of the spread spectrum signal 40 while being deviated from the latter by any desired number of bits. The second mixer 62 inversely spreads the spread spectrum signal 40 by using the PN signal. An output of the mixer 62 is applied to the second BPF 64 for removing unnecessary waves and then to the PSK demodulating device 12. The mixer 62 is capable of correctly demodulating the PSK modulated signal only if the spread spectrum signal 40 and the PN signal are coincident with respect to the bit pattern.

The controller 14 for monitoring the operations of the PSK demodulating device 12 is supplied with input frequency deviation detection signals a and b, a synchronization or sync decision signal c and a sweep stop and cancel signal d from the PSK demodulating device 12 while supplying a frequency sweep signal (for AFC (?)) e to the demodulating device 12. When the demodulating operation of the demodulating device 12 is not correct, the controller 14 generates a sweep control signal 68 which causes the regenerated spread clock coming out of the AND gate 58 to be lost by one pulse at every predetermined interval. If the demodulating operation is correct, the sweep control signal 68 from the controller 14 is such that it allows an output of the phase shifter 56 to be directly applied to the PN generator 60. This kind of monitoring function assigned to the controller 15 is a traditional basic function, and the sweep control signal 58 can be led out without resorting to any special implementation. An example of the controller 14 is disclosed in Japanese Laid-Open Patent Publication (Kokai) No. 63-178642.

To summarize the above procedure, when the spread spectrum signal and the PN signal applied to the second mixer 62 are deviated from each other with respect to the phase of the bit pattern, the controller 14 detects it by referencing the operations of the PSK demodulating device 12 and then generates the sweep control signal 68. As a result, an intermittently omitted recovered spread clock is applied to the PN generator 60 to cause the latter to generate a 1-bit shifted PN signal. Such a shift is repeated a plurality of times until the two patterns coincide with each other. This allows the second mixer 62 to perform inverse spread correctly and thereby allows a correctly demodulated PSK modulated signal to be fed to the PSK demodulating device 12. Hence, a data signal is regenerated with accuracy to form the demodulated data 44 and clock 46. In response to the demodulated data 44 and clock 46, the controller 14 changes the status or content of the sweep control signal 68.

In summary, it will be seen that the present invention provides a spread spectrum demodulating device which eliminates the need for a traditional delay-lock loop, i.e., it allows a spread clock to be directly recovered from a received spread spectrum signal so as to generate a predetermined PN signal. Hence, the device can be implemented in an extremely simple configuration. Since the device does not include any element susceptible to the C/N ratio, the device is operable with accuracy even under low C/N conditions or even if the C/N ratio is lower than zero decibel.

Various modifications will become possible for those skilled in the art after receiving the teachings of the present disclosure without departing from the scope thereof.

What is claimed is:

1. A spread spectrum demodulating device for a spread spectrum communication system, comprising:
   splitter means for splitting into two a spread spectrum signal produced by spreading a PSK (Phase Shift Keying) modulated data signal by a PN (Pseudo Noise) signal;
   delay means for delaying one of two outputs of said splitter means by half a bit;
   first mixer means supplied at one input terminal with the one output of said splitter means and at the other input terminal with an output of said delay means for recovering a spread clock out of the spread spectrum signal;
   first band-pass filter means for filtering an output of said first mixer means to separate the recovered spread clock;
   phase shifter means for adjusting the separated recovered clock with respect to phase;
   AND gate means for gating an output of said phase shifter means in response to a sweep control signal which is entered from outside;
   PN generator means for generating the PN signal in response to the recovered spread clock which is fed from said AND gate means;
   second mixer means for inversely spreading the other output of said splitter means by an output of said PN generator means; and
   second band-pass filter means for removing unnecessary waves from an output of said second mixer means.

2. A device as claimed in claim 1, wherein an output of said second band-pass filter means is fed to a PSK demodulating device which demodulates the data signal, said PSK demodulating device being monitored by controller means to see if said PSK demodulating device is operating correctly.

3. A device as claimed in claim 2, wherein the sweep control signal is fed from said controller means.

* * * * *